United States Patent
Menne et al.

(10) Patent No.: US 10,006,510 B2
(45) Date of Patent: Jun. 26, 2018

(54) HYDRODYNAMIC MACHINE

(71) Applicant: Voith Patent GmbH, Heidenheim (DE)

(72) Inventors: Achim Menne, Crailsheim (DE);
Dieter Laukemann, Frankenhardt (DE); Ravi Schade, Crailsheim (DE); Werner Adams, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days. days.

(21) Appl. No.: 15/165,681

(22) Filed: May 26, 2016

(65) Prior Publication Data

US 2016/0265607 A1  Sep. 15, 2016

Related U.S. Application Data

(63) Continuation of application No. PCT/EP2014/003150, filed on Nov. 26, 2014.

(30) Foreign Application Priority Data

Nov. 26, 2013 (DE) .................. 10 2013 224 095

(51) Int. Cl.
| | |
|---|---|
| *F16D 57/04* | (2006.01) |
| *F16D 23/06* | (2006.01) |
| *F16D 33/18* | (2006.01) |
| *B60T 10/02* | (2006.01) |

(52) U.S. Cl.
CPC .............. *F16D 57/04* (2013.01); *B60T 10/02* (2013.01); *F16D 23/06* (2013.01); *F16D 33/18* (2013.01)

(58) Field of Classification Search
None
See application file for complete search history.

(56) References Cited

U.S. PATENT DOCUMENTS

| | | | | |
|---|---|---|---|---|
| 4,262,781 A | * | 4/1981 | Schneider | ............... F16D 57/04 |
| | | | | 192/12 A |
| 4,972,736 A | * | 11/1990 | Koshimo | ................ F16H 45/02 |
| | | | | 192/105 BA |
| 5,333,707 A | * | 8/1994 | Kaneda | ................... B60T 1/087 |
| | | | | 188/290 |

(Continued)

FOREIGN PATENT DOCUMENTS

| | | |
|---|---|---|
| CN | 101479142 A | 7/2009 |
| CN | 102472332 A | 5/2012 |

(Continued)

OTHER PUBLICATIONS

German Office Action dated Jul. 14, 2016 for German Patent Application No. 10 2013 224 095.3 (10 pages).

(Continued)

*Primary Examiner* — Mark A Manley
(74) *Attorney, Agent, or Firm* — Taylor IP, P.C.

(57) ABSTRACT

A hydrodynamic machine comprising a housing, arranged within said housing: at least one shaft; a toroidal working chamber that can be filled with a working medium, the toroidal working chamber including a first housing with a first bladed wheel and a second housing with a second bladed wheel; a step-up gear arranged with the first bladed wheel about a common rotational axis and mounted such that they can rotate independently of one another; and a coupling device operable to transfer torque between the step-up gear and the first bladed wheel.

16 Claims, 3 Drawing Sheets

(56) References Cited

U.S. PATENT DOCUMENTS

| | | | | |
|---|---|---|---|---|
| 5,566,070 A | * | 10/1996 | Mack | F16H 59/70 |
| | | | | 477/111 |
| 5,651,435 A | * | 7/1997 | Perosky | F16D 23/06 |
| | | | | 192/219 |
| 5,829,562 A | * | 11/1998 | Adams | B60T 1/087 |
| | | | | 192/12 A |
| 7,624,851 B2 | | 12/2009 | Seeger et al. | |
| 2007/0132308 A1 | | 6/2007 | Vogelsang et al. | |
| 2009/0136340 A1 | * | 5/2009 | Adleff | F16D 33/18 |
| | | | | 415/177 |
| 2010/0050635 A1 | * | 3/2010 | Bartosch | F01K 23/065 |
| | | | | 60/616 |
| 2014/0081528 A1 | | 3/2014 | Menne et al. | |
| 2014/0311840 A1 | * | 10/2014 | Menne | B60K 6/12 |
| | | | | 188/290 |

FOREIGN PATENT DOCUMENTS

| | | |
|---|---|---|
| DE | 1 600 148 | 2/1970 |
| DE | 10 2011 120 620 A1 | 6/2013 |
| GB | 1098090 * | 1/1968 |
| WO | 2004/069624 A2 | 8/2004 |
| WO | 2013/083322 A1 | 6/2013 |

OTHER PUBLICATIONS

Chinese Office Action, including an English translation thereof, dated Jun. 30, 2017 for Chinese Application No. 201480064615.9 (13 pages).

\* cited by examiner

HYDRODYNAMIC MACHINE

CROSS REFERENCE TO RELATED APPLICATIONS

This is a continuation of PCT application No. PCT/EP2014/003150, entitled "HYRODYNAMIC MACHINE", filed Nov. 26, 2014, which is incorporated herein by reference.

BACKGROUND OF THE INVENTION

1. Field of the Invention

The invention relates to a hydrodynamic machine, in particular a hydrodynamic retarder for producing a braking torque by way of a working fluid. The invention relates in particular to hydrodynamic retarders that are used as wear-free continuous brakes in drive trains, in particular in motor vehicle drive trains, for example in trucks.

2. Description of the Related Art

Retarders can be designed as water retarders which use the cooling water of the vehicle as the working medium, or as oil retarders which use an oil as the working medium. The water retarder is usually integrated or tied into the vehicle cooling circuit. The oil retarder in contrast includes an oil circuit and an oil cooling circuit wherein the oil cooling circuit can be integrated into the vehicle cooling circuit or can respectively be tied to same.

Such a retarder includes two bladed wheels which together form a toroidal working chamber, at least one of which rotates about a rotational axis of the hydrodynamic machine. The working chamber can be filled for a first operating condition—braking—with working medium via at least one provided working medium inlet. During braking, a circulatory flow occurs in the working chamber, whereby the working medium hydrodynamically transfers a braking torque and/or a driving power from the first to the second bladed wheel. For a second operating condition—non-braking operation—the working medium is pumped from the working chamber of the retarder, in order to avoid a torque and/or driving power transfer.

In order to avoid unnecessary losses due to synchronous rotation of the rotor in non-braking operation, retarders are moreover known that can be decoupled from the drive or respectively the gearbox of the vehicle. For this, a disconnect device is used. The disconnect device is positioned or arranged between gearbox and retarder as disclosed for example in DE 10 2011 120 620 A1, and as a rule is allocated to the gearbox. It is necessary, in particular with water retarders, that the working medium region and the region housing the components that must be lubricated, such as the bearings and the disconnect device, are separated from one another. The lubrication occurs in general by way of oil from the gearbox.

The allocation to the gearbox has the disadvantage that the retarder cannot be supplied together with the disconnect device as a tested component and mounted to the gearbox, as a result of which the operational reliability of the retarder can be compromised.

One of the objectives of the invention is to alter the design in such a way that the operational reliability is improved.

SUMMARY OF THE INVENTION

A hydrodynamic machine according to the invention, in particular a hydrodynamic retarder, includes a housing in which at least one shaft, two bladed wheels and a step-up gear are arranged. One bladed wheel can be designed as a rotor and the other bladed wheel as a stator which together form a toroidal working chamber that can be filled with a working medium. At least one bladed wheel—the rotor, and the step-up gear are arranged about a common rotational axis and are mounted such that they can rotate independently of one another.

According to the invention, for the torque transfer between step-up gear and bladed wheel, in particular a rotor, a coupling device is provided that is arranged in the housing of the hydrodynamic machine. With this arrangement the entire functionality of the retarder can be mounted and tested in advance in one unit.

In one embodiment, the step-up gear can be mounted rotatably on the shaft and the rotor is connected with the shaft non-rotatably. In the non-braking operation, the shaft and the rotor are completely decoupled from the drive side in this arrangement, so that only the mass of the step-up gear must also be moved.

In the sense of the invention the coupling device includes at least one synchronization unit, a coupling unit and an actuator. It is however not excluded that other coupling devices can also be used, for example a friction clutch.

The coupling unit can be a sliding sleeve that is arranged movably on engaging gears on a torque support and from there can be moved onto corresponding gearing on the step-up gear. The coupling unit may moreover include a synchronizing element having locking teeth.

The actuator can include a piston that is movable by a fluid or is electrically actuated, by way of which the sliding sleeve can be moved. Thus the option to operate the actuator by way of oil pressure or pneumatic pressure continues to exist.

Moreover, different concepts are conceivable as to how the coupling device is arranged in the housing. In one embodiment the coupling device—viewed in the axial direction—can be located between the step-up gear and the rotor. Moreover, in this embodiment, the piston can be mounted in the rotor housing.

The piston may for example be designed as an annular piston. However, several individual pistons, for example three, that are activated synchronously can be arranged about the common rotational axis. The possibility thus exists to arrange channels between the pistons.

To discharge leakage losses, the shaft may include a channel that is connected with a leakage chamber in which the leakage losses from the working chamber accumulate. These may for example be returned into the cooling circuit via the gearbox or engine cooling circuit.

In an additional advantageous embodiment, the coupling device—viewed in the axial direction—can be arranged before the step-up gear and the rotor. In this arrangement, leakage losses can be removed via channels in the rotor housing.

A drive train is moreover required for a machine that represent a gearbox and a hydrodynamic machine, in particular a hydrodynamic retarder having at least two bladed wheels, in particular rotor and stator which together form a working chamber that can be filled with a working medium. The gearbox and the hydrodynamic machine are connected structurally, wherein a coupling device is provided for the torque transfer between hydrodynamic machine and gearbox.

It may moreover be provided that lubrication of the coupling device occurs on the gearbox side, wherein at the same time the lubrication of the bearings of the hydrodynamic machine occurs.

Moreover, the shaft can be positioned on the gear side in the gearbox housing, thus simplifying the design of the retarder housing.

If the first embodiment as described above is selected, the leakage losses can be discharged on the gear side. If the second embodiment as described above is selected, the leakage losses can be discharged via at least one channel in the rotor housing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
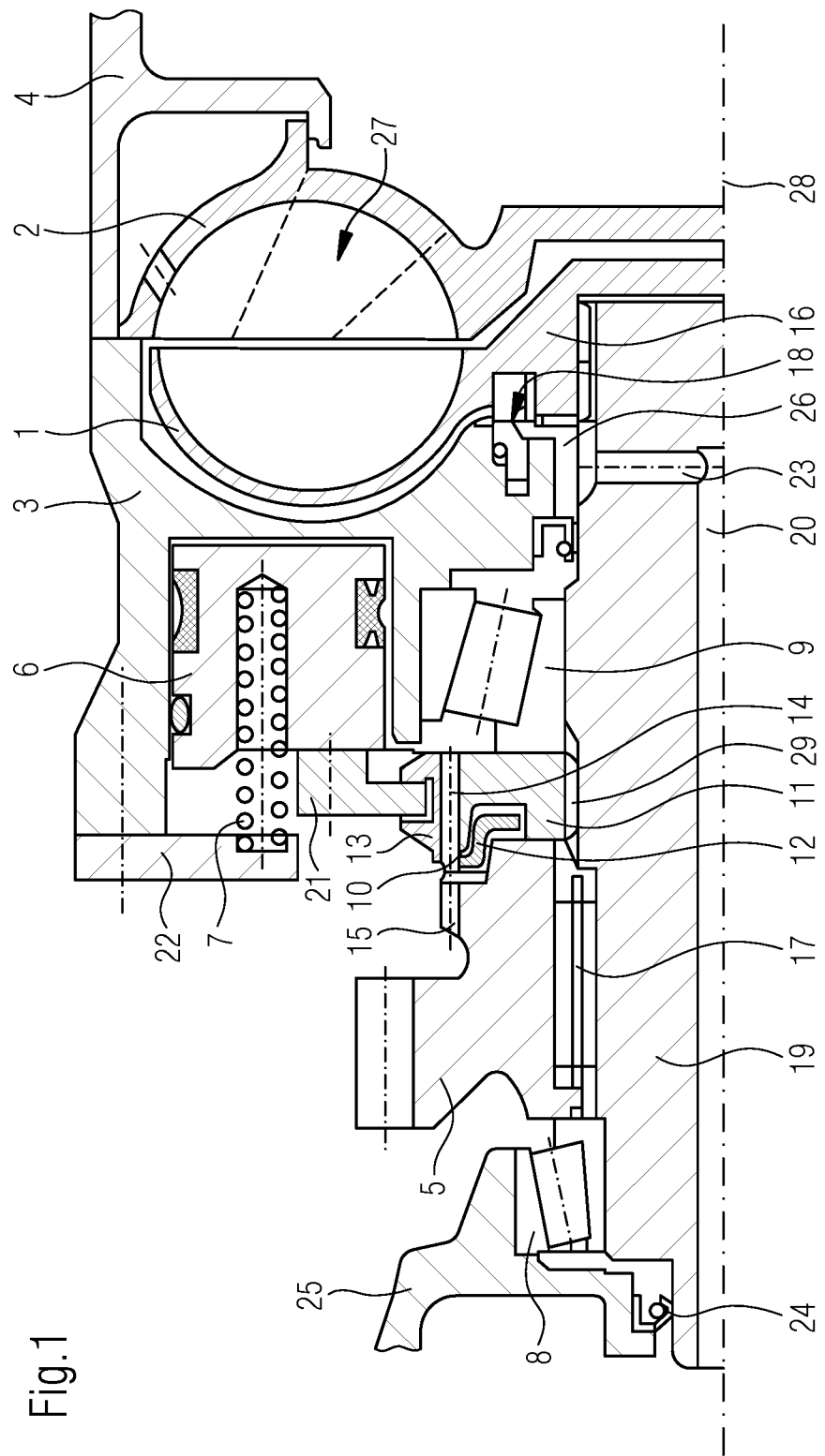
FIG. 1 illustrates a first embodiment of the hydrodynamic machine according to the invention.

FIG. 1 illustrates an inventive first embodiment of a hydrodynamic machine or respectively a hydrodynamic retarder. According to the invention, in this embodiment the coupling device is located within the assembly of the retarder. By way of the coupling device, the retarder can be non-rotatably connected with the gearbox of a drive train. This means that in the non-braking operation, the retarder is decoupled from the gearbox.

When changing over or respectively, as soon as the braking operation is expected or demanded, rotor 1 of the retarder is accelerated to the gearbox speed and finally coupled non-rotationally by way of the coupling device.

In the embodiment illustrated herein, the coupling device is positioned between step-up gear 5 and rotor 1, wherein step-up gear 5 is mounted by way of relative bearing 17 on rotor shaft 19. Only when the coupling device is activated, a non-rotational connection occurs between step-up gear 5 and rotor 1, so that a torque or respectively a braking torque can be transferred from the gearbox 25 to the stator 2.

For simplification of the illustration in FIG. 1 the screw connection between the gearbox housing and the retarder housing was omitted. The connection between retarder and gearbox 25 occurs as shown here, via bearing 8 and a flange connection that is not illustrated here.

The coupling device consists of several functional parts: the activator consisting of a piston 6, a return spring 7 as well as a shift fork 21 that engages with a sliding sleeve 13; a torque support 11; and a synchronizing element 12 between torque support 11 and step-up gear 5. Engaging gears 14, 15 are provided between the components.

Piston 6 can be of various designs. For one, it can be designed as an annular piston that is guided in a circumferential slot about axis 28 in rotor housing 3. Or, at least three individual pistons can be provided that are inserted and guided respectively in a cylindrical bore of rotor housing component 3.

To operate piston 6, supply channels that are not illustrated here are provided through which the piston chamber/s can be filled with a fluid, in particular with air, oil or alternatively cooling water. Alternatively, an electrically operated pushing device can be provided by way of which sliding sleeve 13 can be moved.

Sliding sleeve 13 is mounted movably via engaging gears 14 between sliding sleeve 13 and torque support 11. Torque support 11 is connected non-rotationally with shaft 19. To synchronize the gearbox speed or respectively the speed of step-up gear 5, a synchronizing element having locking teeth 10 is provided between step-up gear 5 and torque support 11. Locking teeth 10 prevent movement of sliding sleeve 13 if engaging gears 14 are not aligned with engaging gears 15 of step-up gear 5 due to the speeds not yet being equalized.

When connecting the retarder, a synchronization of the speed occurs initially of step-up gear 5 and shaft 19 with rotor 1, and in a second step the non-rotational coupling via sliding sleeve 13.

Lubrication of bearings 8, 9 of step-up gear 5 and the coupling device occurs by way of oil, which is also used for gear lubrication.

A channel consisting of channel parts 23, 20 is provided in shaft 19 for removal of leakage water from working chamber 27, through the mechanical ring seal 18 into leakage chamber 26. The channel ends on the drive side in the gearbox and leads into the surrounding area.

Figure 2:
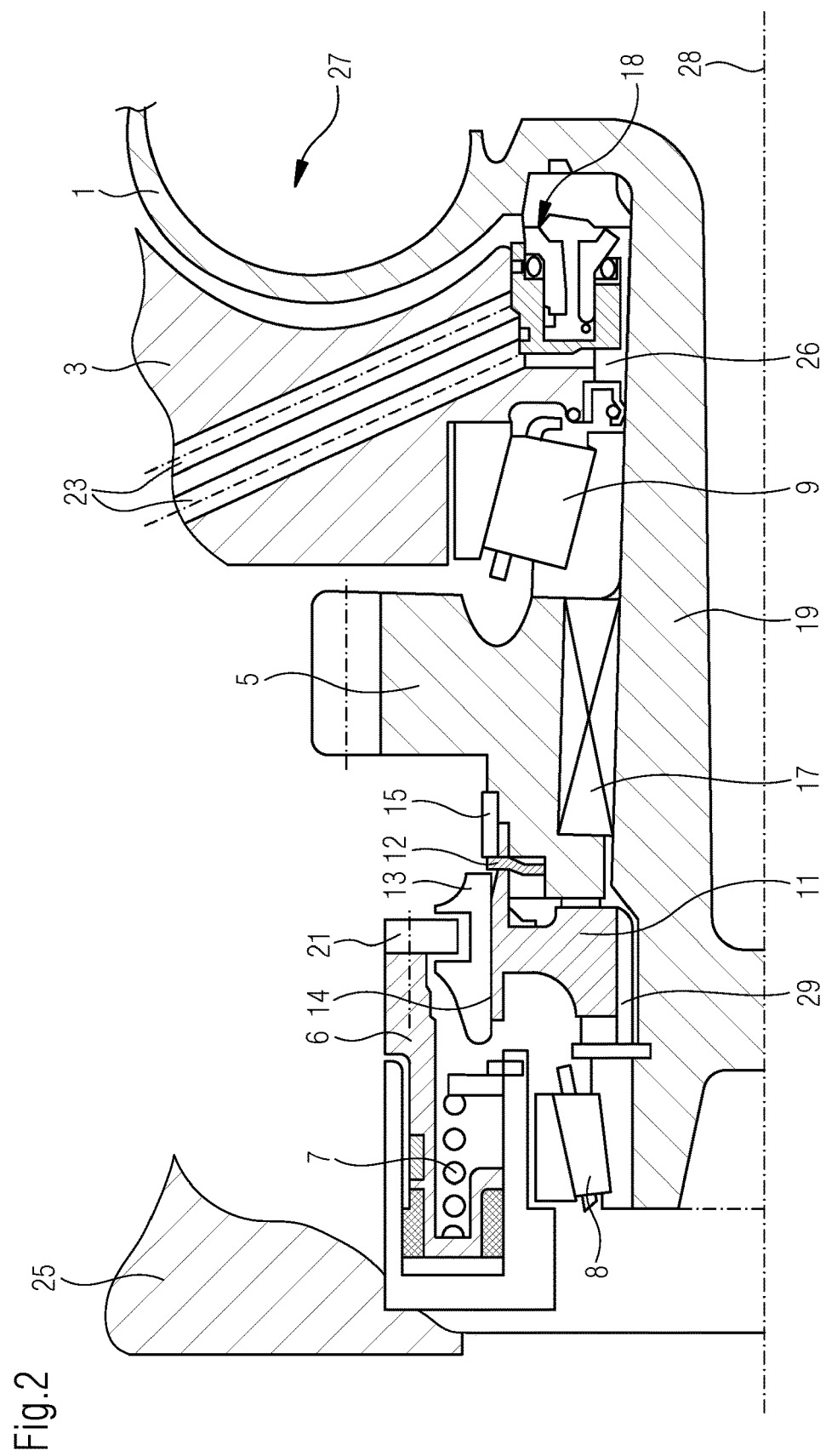
FIG. 2 illustrates a second embodiment of the hydrodynamic machine according to the invention.

FIG. 2 illustrates an inventive second embodiment of a hydrodynamic machine, for example a hydrodynamic retarder. In this embodiment, the coupling device is also located within the assembly of the retarder.

In the embodiment illustrated, the coupling device—viewed in the axial direction—is located before step-up gear 5 and rotor 1, wherein also in this embodiment step-up gear 5 is mounted on rotor shaft 19 by way of a relative bearing 17. A non-rotational connection between step-up gear 5 and rotor 1 occurs only when the coupling device is activated, so that a torque or respectively braking torque can be transferred from the gearbox 25 to the stator 2.

Figure 3:
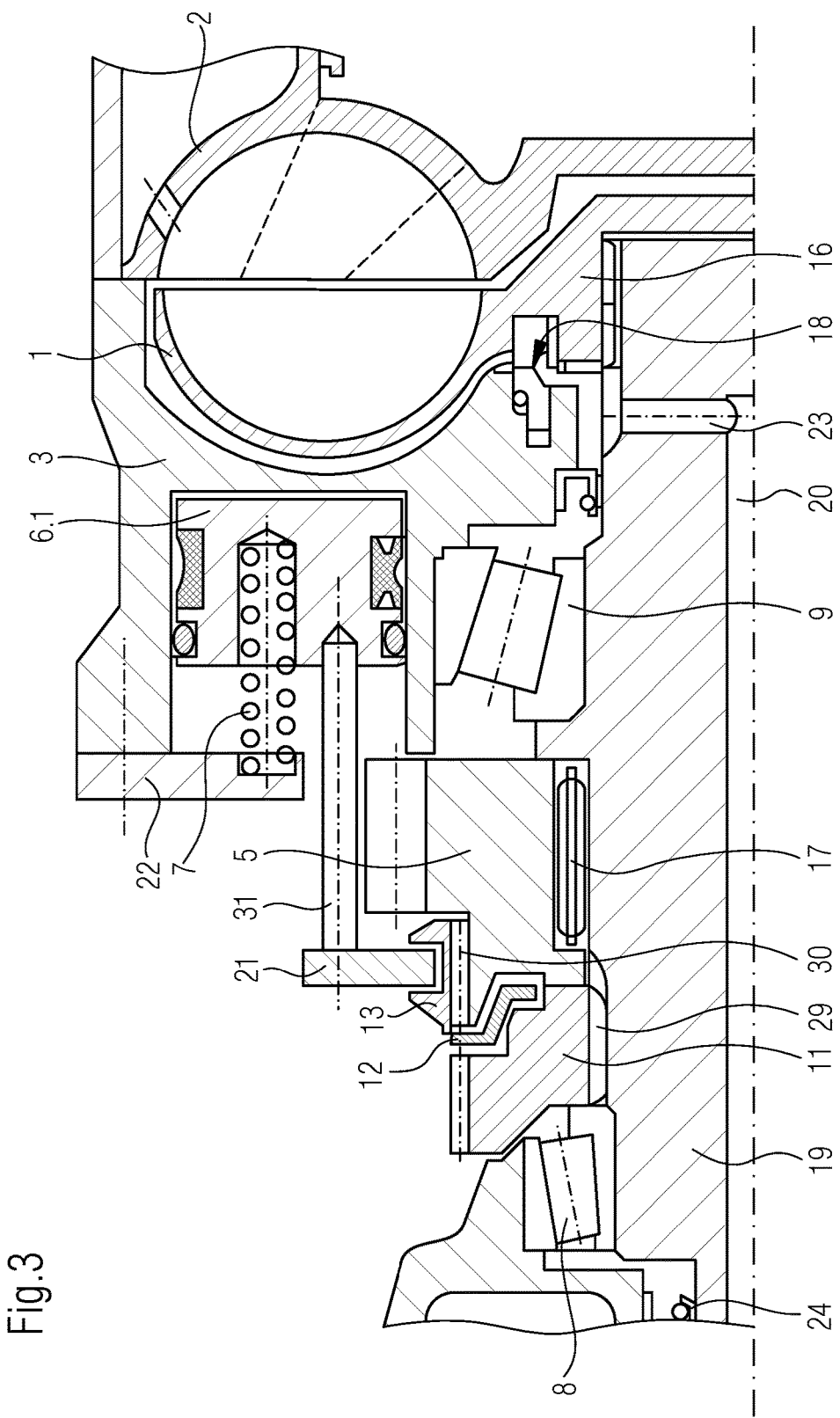
FIG. 3 illustrates a third embodiment of the hydrodynamic machine according to the invention.

FIG. 3 illustrates a third embodiment of the hydrodynamic machine. This embodiment differs from that in FIG. 1 in that the coupling device is arranged with the synchronization between gearbox 25 and step-up gear 5.

Based on this arrangement, step-up gear 5 can be moved close to the circulatory parts, rotor 1 and stator 2. This embodiment moreover differs from that in FIG. 1 in that sliding sleeve 13 in the non-braking operation is arranged on step-up gear 5. This considerably reduces the mass that must be accelerated during synchronization.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST

1. Rotor
2. Stator

3. Rotor housing
4. Stator housing
5. Drive gear
6. Operating piston/single operating piston
7. Return spring
8. Bearing 1
9. Bearing 2
10. Locking teeth
11. Torque support
12. Synchronization element
13. Sliding sleeve
14. Engaging gears sliding sleeve/torque support
15. Engaging gears drive gear
16. Engaging gears shaft/rotor
17. Relative bearing drive gear
18. Mechanical ring seal
19. Retarder shaft
20. Relief bore axial
21. Shift fork
22. Spring holder
23. Relief bore radial
24. Seal 1 (RWDR)
25. Gearbox
26. Leakage chamber
27. Working chamber
28. Rotational axis
29. Engaging gears torque support
30. Holding element shift fork

What is claimed is:

1. A hydrodynamic machine, comprising:
a housing defining a rotor housing and a stator housing, said housing including therein:
at least one shaft;
a toroidal working chamber that can be filled with a working medium, the working chamber including a rotor arranged within the rotor housing and a stator arranged within the stator housing, said rotor is non-rotatably connected to said shaft;
a step-up gear rotatably mounted on said shaft and arranged with the rotor about a common rotational axis and mounted such that they are operable to rotate independently of one another; and
a coupling device operable to transfer torque between the step-up gear and the rotor, said coupling device including:
a coupling unit including a torque support and a sliding sleeve, said torque support is connected non-rotationally with said at least one shaft;
a synchronizing element located between the torque support and the step-up gear, said synchronizing element including locking teeth; and
an actuator including a piston and a shift fork engaging with said sliding sleeve, and said piston is mounted in said rotor housing.

2. The hydrodynamic machine according to claim 1, wherein the hydrodynamic machine is a hydrodynamic retarder.

3. The hydrodynamic machine according to claim 1, wherein the piston is movable by a fluid or is electrically actuated.

4. The hydrodynamic machine according to claim 1, wherein operation of the actuator occurs by way of oil pressure or pneumatic pressure.

5. The hydrodynamic machine according to claim 1, wherein the coupling device is located between the step-up gear and the rotor.

6. The hydrodynamic machine according to claim 1, wherein the shaft includes a channel that is connected with a leakage chamber in which leakage losses from the working chamber accumulate.

7. A drive train for a machine, comprising:
a gearbox;
a hydrodynamic machine connected structurally to the gearbox, the hydrodynamic machine including a housing defining a rotor housing and a stator housing, said housing including therein:
at least one shaft;
a toroidal working chamber that can be filled with a working medium, the working chamber including a rotor arranged within the rotor housing and a stator arranged within the stator housing, said rotor is non-rotatably connected to said shaft;
a step-up gear rotatably mounted on said shaft and arranged with the rotor about a common rotational axis and mounted such that they are operable to rotate independently of one another; and
a coupling device operable to transfer torque between the hydrodynamic machine and the gearbox, said coupling device including:
a coupling unit including a torque support and a sliding sleeve, said torque support is connected non-rotationally with said at least one shaft;
a synchronizing element located between the torque support and the step-up gear, said synchronizing element including locking teeth; and
an actuator including a piston and a shift fork engaging with said sliding sleeve, and said piston is mounted in said rotor housing.

8. The drive train according to claim 7, wherein lubrication of the coupling device occurs on a gear side of a housing for the gearbox.

9. The drive train according to claim 8, wherein lubrication of the hydrodynamic machine occurs at the same time with the lubrication of the coupling device on said gear side of the housing for the gearbox.

10. The drive train according to claim 7, wherein the shaft is positioned on a gear side of a housing for the gearbox.

11. The drive train according to claim 7, wherein leakage losses are discharged on a gear side of a housing for the gearbox.

12. A drive train for a machine, comprising:
a gearbox;
a hydrodynamic machine connected structurally to the gearbox, the hydrodynamic machine including a housing defining a rotor housing and a stator housing, said housing including therein:
at least one shaft;
a toroidal working chamber that can be filled with a working medium, the working chamber including a rotor arranged in the rotor housing and a stator arranged in the stator housing, said rotor is non-rotatably connected to said shaft;
a step-up gear rotatably mounted on said shaft and arranged with the rotor about a common rotational axis and mounted such that they are operable to rotate independently of one another; and
a coupling device operable to transfer torque between the hydrodynamic machine and the gearbox, said coupling device including:
a coupling unit including a torque support and a sliding sleeve, said torque support is connected non-rotationally with said at least one shaft;

a synchronizing element located between the torque support and the step-up gear, said synchronizing element including locking teeth; and an actuator located in between the step-up gear and the gearbox and including a piston and a shift fork engaging with said sliding sleeve, wherein the step-up gear is positioned in between the coupling device and the rotor.

13. The drive train according to claim 12, wherein the coupling device is located before the step-up gear and the rotor.

14. The drive train according to claim 12, wherein the rotor housing includes at least one channel such that leakage losses from the working chamber are discharged via said at least one channel.

15. The drive train according to claim 12, wherein lubrication of the coupling device occurs on a gear side of a housing for the gearbox.

16. The drive train according to claim 15, wherein lubrication of the hydrodynamic machine occurs at the same time with the lubrication of the coupling device on said gear side of the housing for the gearbox.

\* \* \* \* \*